(12) United States Patent
Stoufflet

(10) Patent No.: US 11,018,755 B2
(45) Date of Patent: May 25, 2021

(54) NETWORK FOR ENABLING BEYOND VISUAL LINE OF SIGHT AIRCRAFT COMMAND AND CONTROL COMMUNICATIONS

(71) Applicant: Bell Textron Inc., Fort Worth, TX (US)

(72) Inventor: Mark David Stoufflet, Arlington, TX (US)

(73) Assignee: BELL TEXTRON INC., Fort Worth, TX (US)

( * ) Notice: Subject to any disclaimer, the term of this patent is extended or adjusted under 35 U.S.C. 154(b) by 15 days.

(21) Appl. No.: 16/541,960

(22) Filed: Aug. 15, 2019

(65) Prior Publication Data

US 2021/0050911 A1 Feb. 18, 2021

(51) Int. Cl.
| | | |
|---|---|---|
| *H04B 7/185* | (2006.01) | |
| *B64C 39/02* | (2006.01) | |
| *H01Q 1/28* | (2006.01) | |
| *H04W 84/06* | (2009.01) | |

(52) U.S. Cl.
CPC ....... *H04B 7/18508* (2013.01); *B64C 39/024* (2013.01); *H01Q 1/286* (2013.01); *B64C 2201/027* (2013.01); *B64C 2201/122* (2013.01); *H04W 84/06* (2013.01)

(58) Field of Classification Search
CPC ... H04B 7/18508; B64C 39/024; H01Q 1/286
See application file for complete search history.

(56) References Cited

U.S. PATENT DOCUMENTS

2006/0229080 A1* 10/2006 Khan ................. H04Q 7/20

* cited by examiner

*Primary Examiner* — Ronald B Abelson
(74) *Attorney, Agent, or Firm* — Patent Capital Group

(57) ABSTRACT

One embodiment is an apparatus comprising an aircraft and an aerial network communications system associated with the aircraft. The network communications system may comprise an antenna physically connected to an outside surface of the aircraft; and a transceiver electrically connected to the antenna. The aerial network communications system receives signals from and transmits signals to an unmanned aerial vehicle ("UAV") via a communications network comprising a control station and a plurality of airborne network nodes.

18 Claims, 7 Drawing Sheets

NETWORK FOR ENABLING BEYOND VISUAL LINE OF SIGHT AIRCRAFT COMMAND AND CONTROL COMMUNICATIONS

TECHNICAL FIELD

This disclosure relates in general to the field of aircraft and, more particularly, though not exclusively, to networks for enabling Beyond Visual Line of Sight ("BVLOS") aircraft Command and Control ("C2") communications.

BACKGROUND

Unlike fixed-wing aircraft, vertical takeoff and landing ("VTOL") aircraft do not require runways. Instead, VTOL aircraft are capable of taking off, hovering, and landing vertically. One example of VTOL aircraft is a helicopter, which is a rotorcraft having one or more rotors that provide vertical lift and forward thrust to the aircraft. Helicopter rotors not only enable hovering and vertical takeoff and vertical landing, but also enable forward, aftward, and lateral flight. These attributes make helicopters highly versatile for use in congested, isolated or remote areas where fixed-wing aircraft may be unable to take off and land. Helicopters, however, typically lack the forward airspeed of fixed-wing aircraft.

A tiltrotor is another example of a VTOL aircraft. Tiltrotor aircraft utilize tiltable rotor systems that may be transitioned between a forward thrust orientation and a vertical lift orientation. The rotor systems are tiltable relative to one or more fixed wings such that the associated proprotors have a generally horizontal plane of rotation for vertical takeoff, hovering, and vertical landing and a generally vertical plane of rotation for forward flight, or airplane mode, in which the fixed wing or wings provide lift. In this manner, tiltrotor aircraft combine the vertical lift capability of a helicopter with the speed and range of fixed-wing aircraft.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based, or remote, controller, and a system of communication between the vehicle and controller.

BVLOS refers to UAV flights performed beyond the pilot's line of sight (as opposed to VLOS flights, which are performed within the pilot's line of sight). BVLOS flights represent a huge area of opportunity for the UAV industry in terms of commercial applications (e.g., package delivery, railroad inspections, pipeline inspections, windmill inspections, agricultural inspections, mapping, and powerline inspections), as well as government and public applications (e.g., search and rescue, firefighting, police work, conservation management, and border control). Each of the aforementioned (and other) applications requires large distances beyond a pilot's visual line of sight to be covered for useful, actionable information to be gathered.

SUMMARY

One embodiment is an apparatus comprising an aircraft and an aerial network communications system associated with the aircraft. The network communications system may comprise an antenna physically connected to an outside surface of the aircraft; and a transceiver electrically connected to the antenna. The aerial network communications system receives signals from and transmits signals to an unmanned aerial vehicle ("UAV") via a communications network comprising a control station and a plurality of airborne network nodes.

In one embodiment, the aerial network communications system is electrically connected to a power system of the aircraft deriving operational power therefrom. In another embodiment, the aerial network communications system is electrically connected to a control system of the aircraft deriving operational information therefrom. In yet another embodiment, the antenna is physically connected to a cargo door of the aircraft and the transceiver is disposed in an interior of the aircraft. The signals received from and transmitted to the UAV may comprise aircraft command and control ("C2") signals. In certain embodiments, the antenna is a conformal antenna and is positioned so as not to negatively impact aerodynamic performance of the aircraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
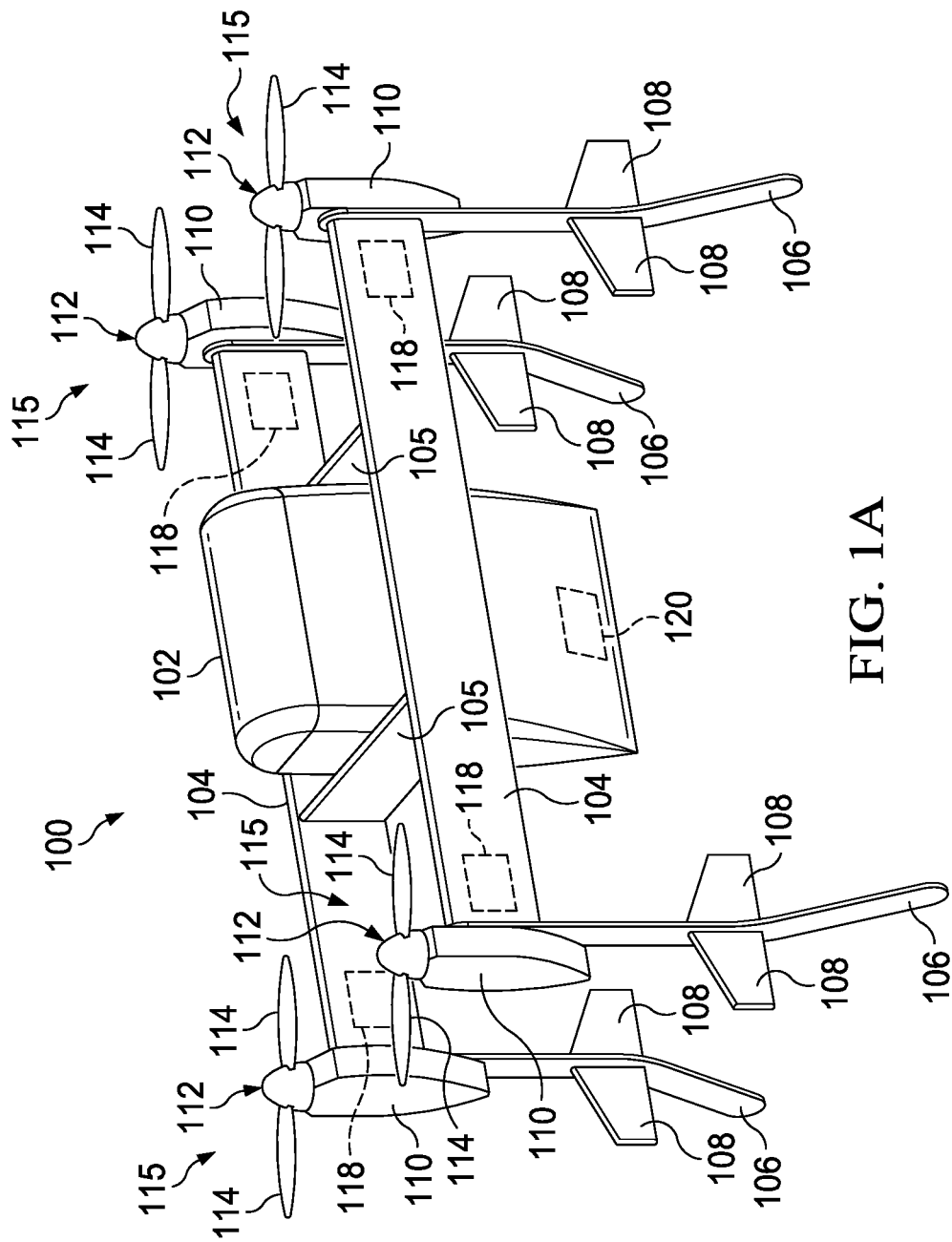
FIGS. 1A-1B are simplified diagrams of an example UAV, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that is farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
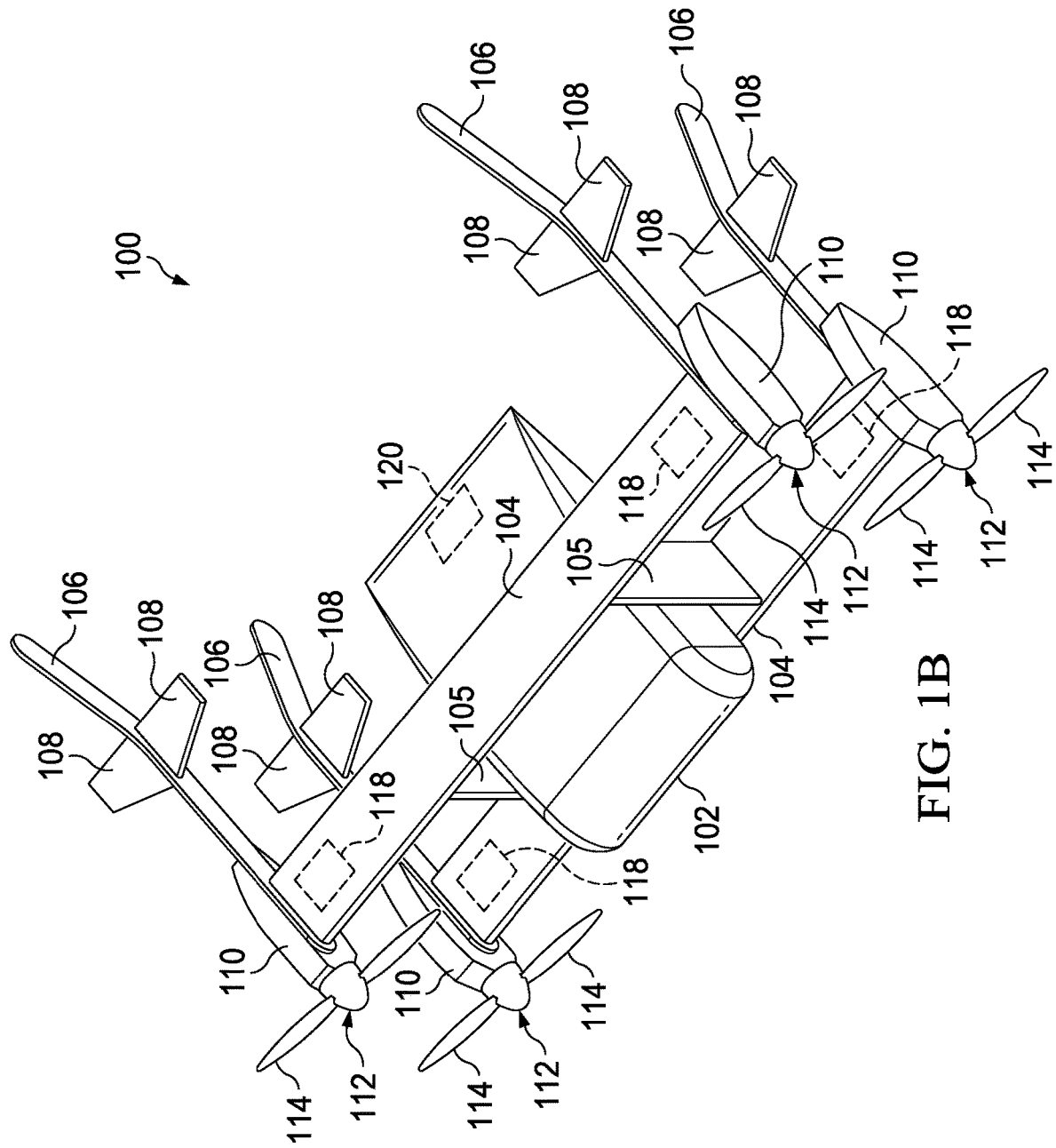

Referring now to FIGS. 1A-1B, FIGS. 1A-1B illustrate example embodiments of an example aircraft 100, which in these examples is generally configured as a vertical takeoff and landing ("VTOL") aircraft. More specifically, aircraft 100 may be an autonomous pod transport ("APT") convertible drone-type aircraft (discussed in further detail below) that is operable in different flight modes including a helicopter mode (as shown in FIG. 1A) and an airplane mode (as shown in FIG. 1B). In helicopter mode, aircraft 100 may be capable of various flight maneuvers including, but not limited to, vertical takeoff from and landing to one or more landing zone(s), hover, and/or sideward and rearward mobility or flight. In airplane mode, aircraft 100 may be capable of forward flight maneuvers. Additionally, since aircraft 100 is a convertible aircraft, it is also operable in a conversion, or transition, mode when transitioning between the helicopter and airplane modes.

As previously noted, unlike fixed-wing aircraft, VTOL aircraft do not require runways. Instead, VTOL aircraft are capable of taking off, hovering, and landing vertically. As also noted above, helicopters and tiltrotors are examples of VTOL aircraft. Yet another type of VTOL aircraft is commonly referred to as a "tail-sitter" aircraft. As the name implies, a tail-sitter aircraft takes off and lands on its tail, but tilts horizontally for forward flight. As illustrated in the embodiments of FIGS. 1A-1B, aircraft 100 is configured as a tail-sitter aircraft. Being a drone-type aircraft, aircraft 100 is configured for remote control and operation. Additionally, at least in some embodiments, aircraft 100 may be fully autonomous and self-directed via a predetermined or pre-programmed location-based guidance system (e.g., global positioning system ("GPS"), coordinate-based location, street address, etc.).

In at least one embodiment, aircraft 100 may include a cargo pod 102 that functions as the fuselage, wings 104, vertical supports 105 disposed between the wings 104, tail booms 106, horizontal stabilizers 108 extending from each tail boom 106, and a plurality of pylons 110 each comprising a rotor system 112 having a plurality of rotor blades 114. Each combination of a pylon 110 and its associated rotor system 112 comprising rotor blades 114 may be referred to herein as a propulsion assembly 115. Aircraft 100 may also include plurality of aircraft sensors 118 and a control system 120, which in some embodiments may include a GPS system. Wings 104 comprise a substantially parallel, double-wing (sometimes referred to as "biplane") configuration that provides lift to the aircraft 100 during forward flight (e.g., as shown in FIG. 1B) while also maintaining a smaller footprint of the aircraft 100 when the aircraft 100 is on the ground. Vertical supports 105 are disposed on each side of the cargo pod 102 and affixed between the wings 104 to provide structure and support to the wings 104. The cargo pod 102 is generally positioned between the wings 104 and the vertical supports 105. In the embodiment shown, the cargo pod 102 is affixed to the vertical supports 105. However, in other embodiments, the cargo pod 102 may be affixed to the wings 104 or both the wings 104 and vertical supports 105. Additionally, while two vertical supports 105 are shown, in some embodiments, aircraft 100 may comprise more vertical supports 105 depending on the configuration of the aircraft 100.

Tail booms 106 are disposed on the outboard ends of each wing 104. The tail booms 106 are curved at the aft ends to provide stabilization to the aircraft 100 during forward flight in a manner substantially similar as other tail surfaces known in the art, while also doubling as a landing gear for the aircraft 100. As such the curved ends of the tail booms 106 may provide a wider base for landing gear uses. Each tail boom 106 also comprises a pair of horizontal stabilizers 108 coupled to each of an inner and outer surface of the tail boom 106. The horizontal stabilizers 108 function to provide stabilization to the aircraft 100 during forward flight in a manner substantially similar as horizontal stabilizers known in the art. Pylons 110 are disposed on outboard sides of each tail boom 106 proximate the outboard end of each wing 104. Each pylon 110 comprises a selectively rotatable rotor system 112 having a plurality of rotor blades 114 coupled thereto. In the embodiment shown, each rotor system 112 is driven by an associated electric motor (not shown) within each pylon 110. However, in other embodiments, the rotor systems 112 may be driven by a combustion engines or auxiliary power unit through a plurality of interconnect driveshafts and/or auxiliary gearboxes, which may be housed within any portion of an aircraft (e.g., within a pylon, fuselage, combinations thereof, or the like). Furthermore, since aircraft 100 functions as a convertible aircraft, the rotational speeds of each rotor system 112 may be selectively controlled to orient aircraft 100 in the various flight modes.

In various embodiments, control system 120 may include one or more processor(s), memory element(s), network connectivity device(s), storage, input/output (I/O) device(s), combinations thereof, or the like to facilitate operations of each propulsion assembly 115 and/or other electronic systems of aircraft 100. In various embodiments, operation of each propulsion assembly 115 may include controlling the rotational speed of rotor systems 112, adjusting thrust vectors of rotor systems 112, and the like to facilitate vertical lift operations, forward thrust operations, transition operations, combinations thereof, or the like for aircraft 100. In some embodiments, feedback may be received by control system 120 (e.g., via each propulsion assembly 115, one or more sensors 118, etc.) to facilitate or augment various operations of aircraft 100. In various embodiments, sensors 118 may include, but not be limited to, positioning sensors, attitude sensors, speed sensors, environmental sensors, fuel sensors, temperature sensors, location sensors, combinations thereof, or the like.

When aircraft 100 is in a helicopter mode position, rotor systems 112 may provide a vertical lifting thrust for aircraft systems 100, which may enable hover flight operations to be performed by aircraft 100. When aircraft 100 is in an airplane mode position, rotor systems 112 may provide a forward thrust and a lifting force may be supplied by wings 104.

Figure 2A:
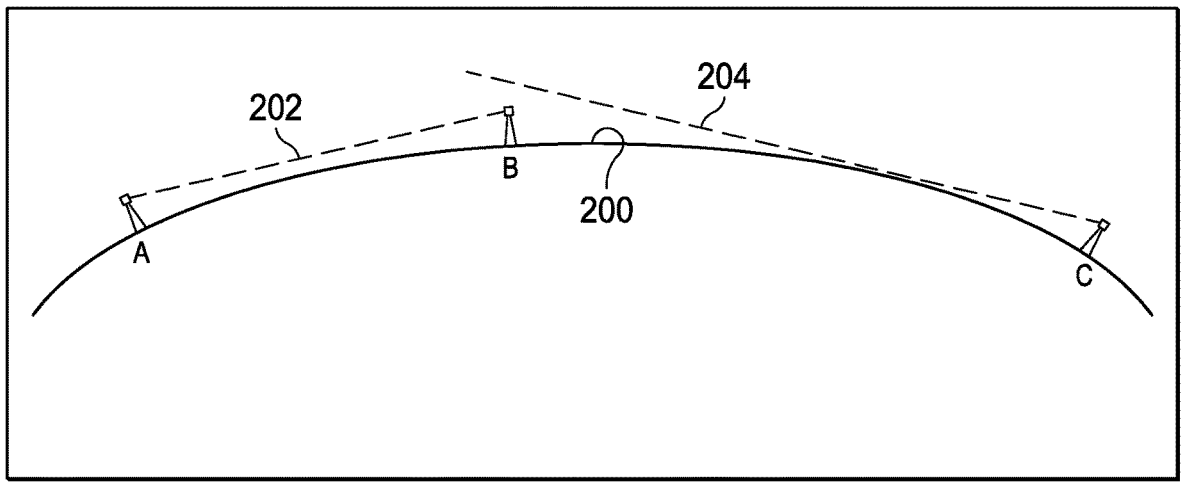
FIGS. 2A-2B illustrate the concept of line-of-sight ("LOS) and the relationship between radio height and coverage in accordance with embodiments described herein.
Figure 2B:
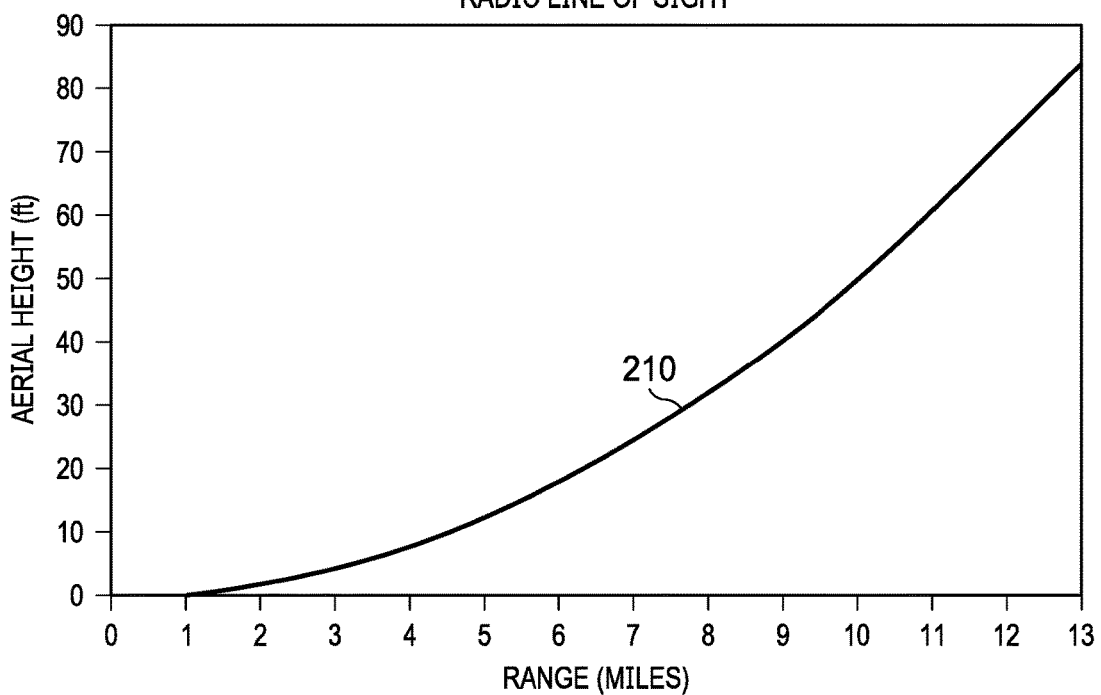

As will be described in greater detail below, this disclosure relates to use of the commercial airlines fleet as an airborne platform for enabling BVLOS communications for C2, as well as payload downlink and other types of communications (beyond C2), for UAVs. Currently, BVLOS technologies and platforms available for C2 and other communications and payload downlink for UAVs are extremely limited. FIG. 2A illustrates the concept of line-of-sight ("LOS") in the context of three radio towers (A, B, and C) on the surface of the earth, represented by an arc 200. As seen in FIG. 2A, radio LOS exists between towers A and B, as represented by a line 202. In contrast, point C lacks radio LOS with both point A and point B, as represented by a line 204. FIG. 2B is a graph illustrating the general frequency-based relationship between the aerial height (in feet) above the ground of a radio communications device and the range of coverage (in miles) to ground surface due to the curvature of the earth. As shown in FIG. 2B, for all points above a line 210, radio coverage exists. In contrast, due to the curvature of the earth, radio coverage does not exist for all points below the line 210. In the example illustrated in FIG. 2B, a communications device having a height of 40 feet will provide approximately 9 miles of coverage, while a communications device having a height of 60 feet will provide approximately 11 miles of coverage. As clearly illustrated in FIG. 2B, there is a relationship between the height of the communications device and the range of coverage provided by the device. As evident from FIGS. 2A and 2B, even with no obstacles, radio LOS is quite limited in range for ground based or low-level operations.

Figure 3:
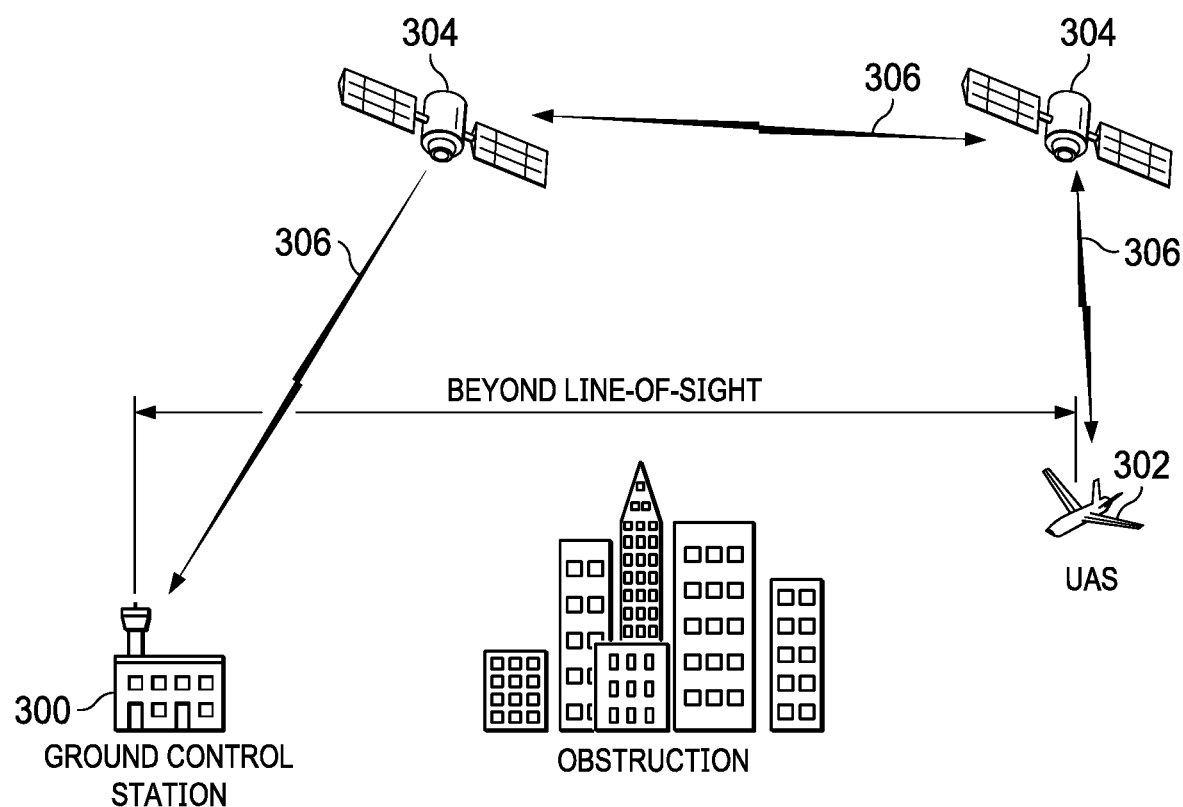
FIG. 3 is a conceptual illustration of an example system for using a satellite communications network for enabling BVLOS communications for UAV C2 and other signals.
Figure 4:
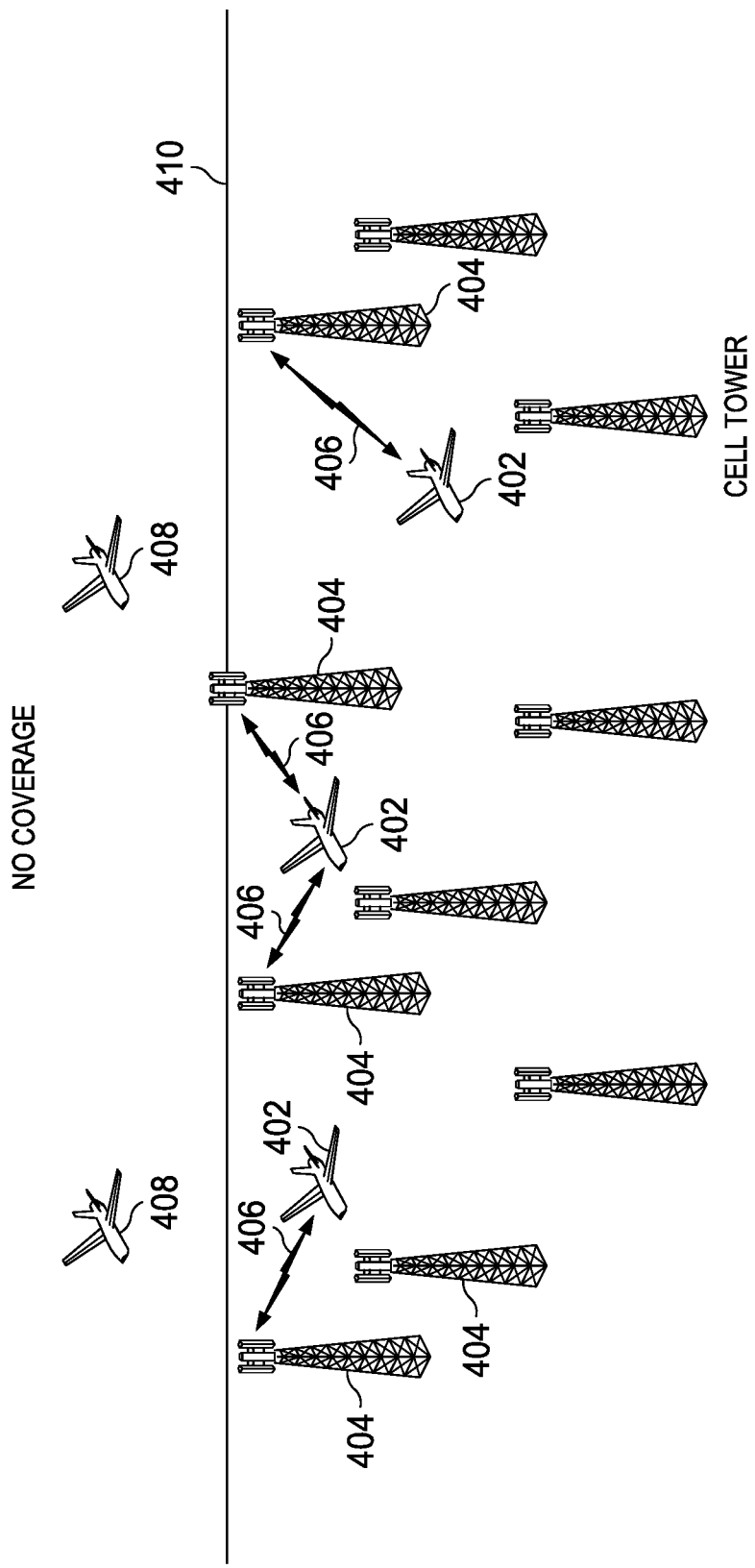
FIG. 4 is a conceptual illustration of an example system for using distributed ground-based towers, such as cellular towers, to create a communications network for enabling BVLOS communications for UAV C2 and other information-based signals.

For this reason, satellite communications may appear to be an attractive choice for supporting BVLOS aircraft communications, in that, due to the height of the satellites above the earth, they are capable of providing a broad range of coverage. For example, as shown in FIG. 3, bi-directional C2 and other communications between a ground control station 300 and a UAS 302 that is beyond the LOS of the station 300, may be routed via a satellite communications network, represented in FIG. 3 by satellites 304, as illustrated by dashed lines 306. Drawbacks to using satellite communications for BVLOS communications include issues with latency, frequency bandwidth, high cost, limited availability, and high transmit power and/or high gain directional steering required from UAVs. Additionally, satellites might not even be practical in some environments due to the angle required to access the geostationary satellite. As an alternative to using satellite communications networks, cellular communications networks, which are generally less expensive, faster, and able to handle higher bandwidths than satellite communications networks, may be used. For example, as shown in FIG. 4, bi-directional C2 and other communications between one or more ground control stations (not shown in FIG. 4) and a number of UAVs 402 that are beyond the LOS of their respective ground control stations, may be routed via a cellular communications network, represented in FIG. 4 by cellular towers 404, as illustrated by arrows 406. Drawbacks to using cellular network communications for BVLOS aircraft communications include that cellular network coverage is not ubiquitous and is designed to be used close to the ground. For example, as shown in FIG. 4, a number of UAVs 408 are higher than a "horizon line" 410 corresponding to a maximum height of the coverage area of the cellular communications network and are therefore not in communication with the cellular communications network.

In accordance with features of embodiments described herein, the foregoing deficiencies in the prior art are remedied through use of the commercial airlines fleet as an airborne platform for enabling BVLOS communications for C2, as well as payload downlink, for UAVs. In some embodiments, antennas are installed on the body of commercial airliners in such a manner as to not interfere with their flight. For example, a conformal antenna may be installed on exterior of existing baggage bay, or cargo, doors of a commercial aircraft for ease of installation and maintenance and a corresponding transceiver/repeater may be mounted (possibly internally) to the back side of the door and powered from the available aircraft power.

Figure 5:
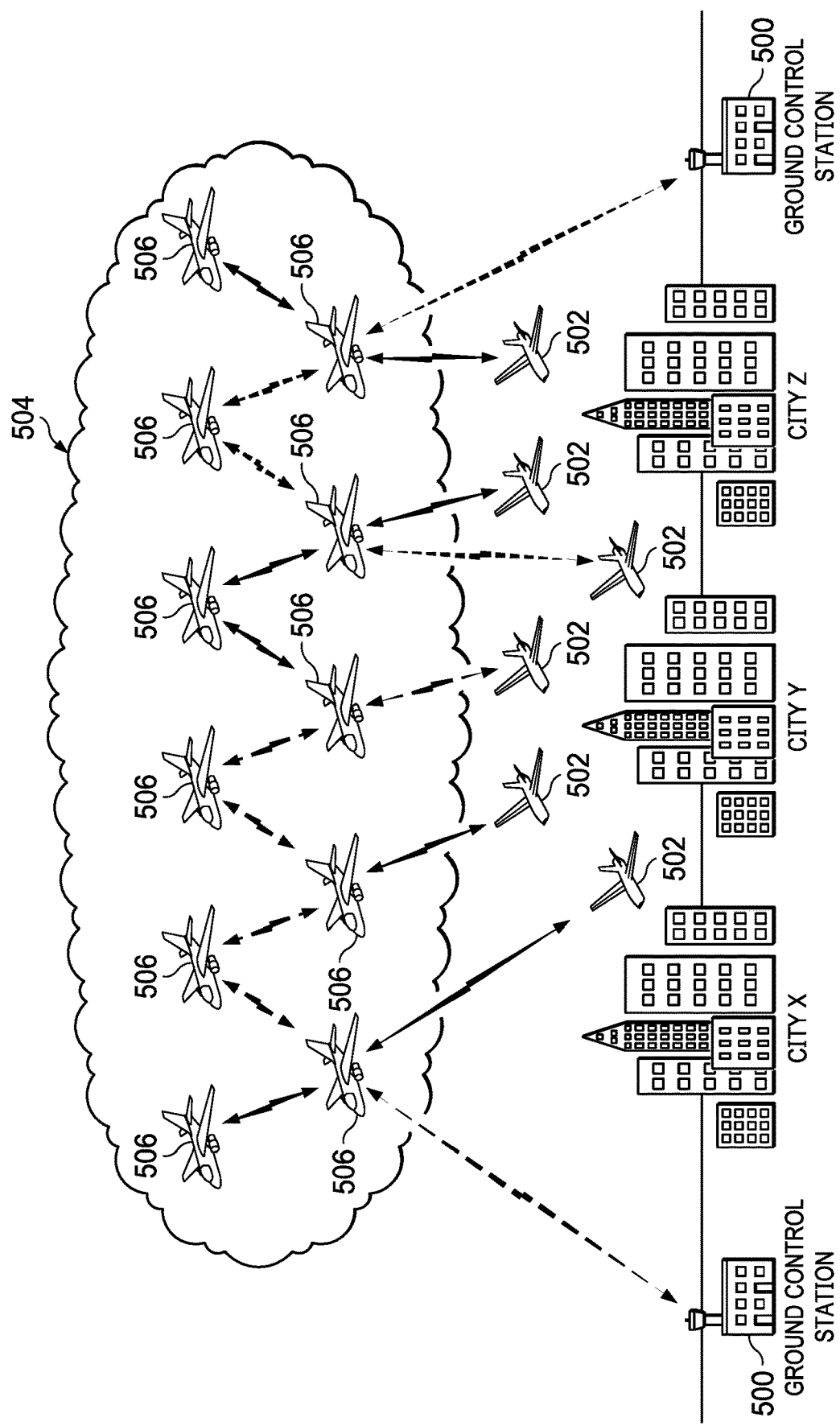
FIG. 5 is a conceptual illustration of a system for using a commercial airlines fleet as an airborne platform for enabling BVLOS communications for UAV C2 in accordance with features of embodiments described herein.

FIG. 5 is a conceptual illustration of a system for using a commercial airlines fleet as an airborne platform for enabling BVLOS communications for C2 and other communications, as well as payload downlink, for UAVs in accordance with features of certain embodiments. As shown in FIG. 5, one or more ground control stations 500 are in communication with one or more UAVs 502 that are not in LOS of the stations 500 via a network cloud in the sky ("NCS") 504 comprising a mobile ad hoc network ("MANET"), or "mesh network," of a plurality of commercial aircraft 506, each of which is equipped with communications equipment (e.g., an antenna and a transceiver, as shown in FIG. 6) for enabling bi-directional communications between and among the aircraft 506, with ground control stations 500 (also equipped with an antenna and a transceiver, as shown in FIG. 6), and with UAVs 502 (also equipped with an antenna and a transceiver, as shown in FIG. 6).

Figure 6:
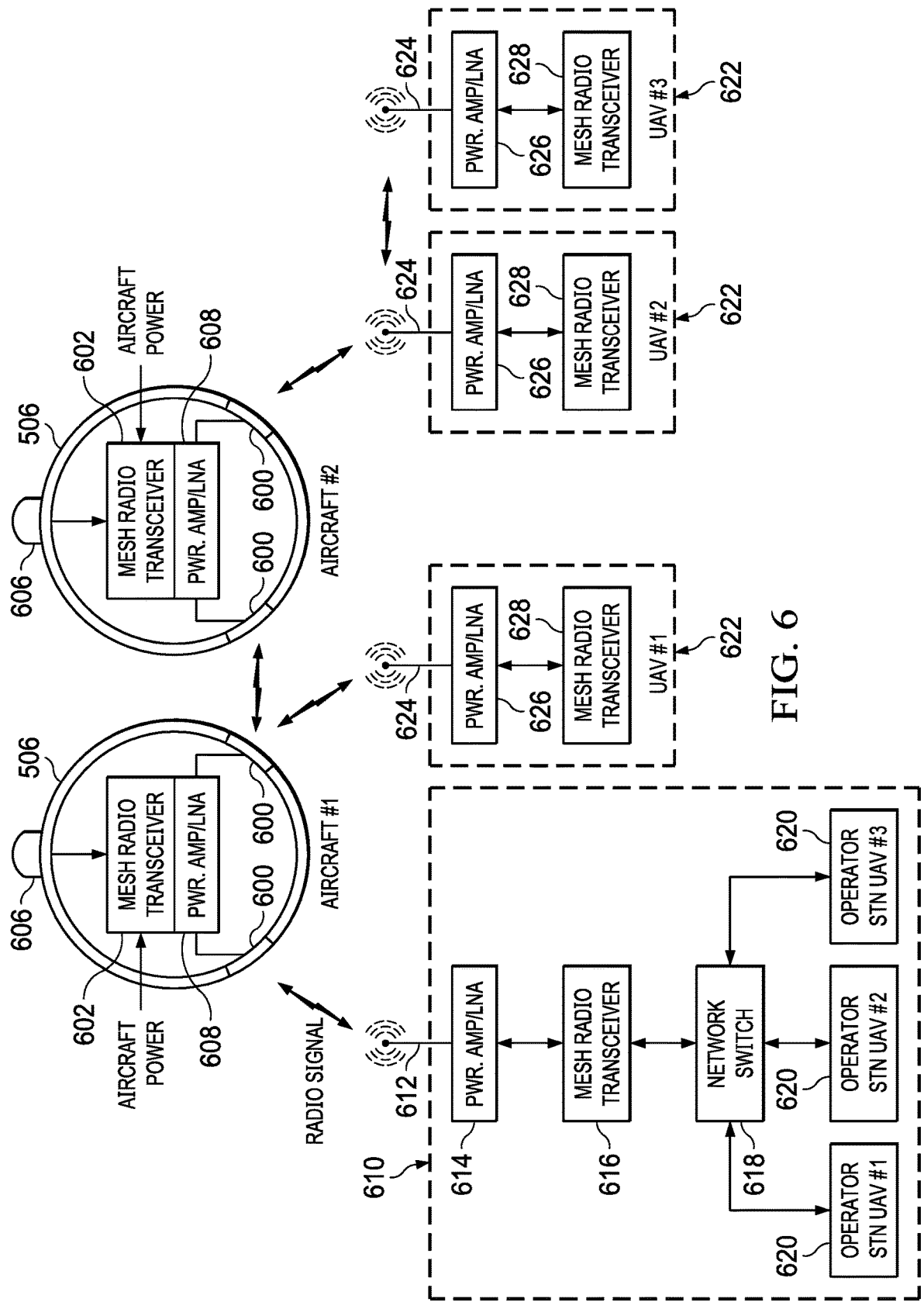
FIG. 6 is a simplified block diagram of communications equipment for implementing the system of FIG. 5.

FIG. 6 is a simplified block diagram illustrating communications equipment for enabling implementation of the system of FIG. 5. As shown in FIG. 6, each of aircraft 506 has mounted or otherwise affixed thereto (e.g., on the exterior thereof) one or more antennas 600 for receiving and transmitting communications signals, such as UAV C2 and other signals. In certain embodiments, antennas 600 may be conformal antennas, such as a conformal printed antenna, a rigid conformal antenna, or a thin film conformal antenna. In other embodiments, other types of antennas (e.g., blade antennas) may be advantageously deployed. Additionally, a mesh network transceiver 602 is provided and may be mounted or otherwise affixed to an interior of aircraft 506 and connected to receive power from aircraft power system (not shown). The power to the mesh network transceiver 602 may be connected such that the pilot can turn off the mesh network transceiver if desired (e.g., by pulling an appropriate breaker or switch in the cockpit of the aircraft 506), thereby removing the mesh network transceiver from the mesh network/NCS. In some embodiments, mesh network transceivers 602 may be implemented using an Embedded Module wave relay transceiver (e.g., model MPUS) available from Persistent Systems, LLC, located in New York, N.Y., although it will be recognized that other transceivers may be advantageously used without departing from the spirit and scope of the embodiments. In certain embodiments, mesh network transceiver 602 receives location information from a GPS antenna 606 of the aircraft 506 in which it is installed. In other embodiments, the control system (FIG. 1) of the aircraft 506 may provide GPS positioning information to the mesh network transceiver 602 installed therein using an appropriate communication protocol/format. A power amplifier and/or low noise amplifier ("LNA") 608 is provided in the aircraft 506 to amplify the signal between the transceiver 602 and the antenna(s) 600 in a conventional fashion.

As shown in FIG. 6, radio signals are communicated between antennas 600 and one or more base stations, represented in FIG. 6 by a base station 610, each of which includes an antenna 612, a power amplifier/LNA 614, a mesh network transceiver 616, and a network switch 618 for switching between one or more operator stations 620, each of which may control a respective one of one or more UAVs 622. Each of the UAVs 622 also includes an antenna 624 for transmitting radio signals to/receiving radio signals from antennas 600, 612, 624, a power amplifier/LNA 626, and a mesh network transceiver 628. It will be recognized that the transceivers 602, 616, and 628, when within geographic range of one another, interact to form a mesh network/NCS, as illustrated in FIG. 5.

In operation, when an aircraft is within range of a particular mesh network, the mesh network transceiver installed therein will perform the appropriate handshaking and negotiating required to join the network. If/when the aircraft ventures too far away from the mesh network for its mesh network transceiver to maintain communication, the transceiver will drop out of the network and wait until it can join another mesh network, if possible.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. Apparatus comprising:
   an aircraft comprising a fuselage having an upper body portion and a lower body portion;
   an aerial network communications system associated with the aircraft, the network communications system comprising:

an antenna physically connected to an external surface of the lower body portion of the aircraft fuselage, wherein the antenna conforms to a shape of the lower body portion of the aircraft fuselage and comprises at least one of a conformal printed antenna, a rigid conformal antenna, and a thin film conformal antenna; and a mesh network transceiver electrically connected to the antenna;

wherein the aerial network communications system receives signals from and transmits signals to an unmanned aerial vehicle ("UAV") via a communications network comprising a control station and a plurality of airborne network nodes comprising the aircraft.

2. The apparatus of claim 1, wherein the aerial network communications system is electrically connected to a power system of the aircraft for deriving operational power therefrom.

3. The apparatus of claim 1, wherein the aerial network communications system is electrically connected to a control system of the aircraft for deriving operational information therefrom.

4. The apparatus of claim 1, wherein the antenna is physically connected to an external surface of a cargo door of the aircraft.

5. The apparatus of claim 1, wherein the mesh network transceiver is disposed in an interior of the aircraft.

6. The apparatus of claim 1, wherein the signals received from and transmitted to the UAV comprise aircraft command and control ("C2") signals.

7. The apparatus of claim 1, wherein the antenna is configured so as not to negatively impact aerodynamic performance of the aircraft when the antenna is connected to the aircraft.

8. A communications network comprising:
a plurality of aircraft comprising nodes of the communications network, wherein each of the aircraft comprises:
  a fuselage having an upper body portion and a lower body portion;
  a network communications system associated with the aircraft, the network communications system comprising:
    an antenna physically connected to an outside surface of the lower body portion of the aircraft fuselage, wherein the antenna conforms to a shape of the lower body portion of the aircraft fuselage and comprises at least one of a conformal printed antenna, a rigid conformal antenna, and a thin film conformal antenna; and
    a mesh network transceiver electrically connected to the antenna; and
    wherein the network communications system receives signals from and transmits signals to an unmanned aerial vehicle ("UAV") via the communications network; and
at least one control station for generating and receiving aircraft command and control ("C2") signals.

9. The communications network of claim 8, wherein each network communications system is electrically connected to a power system of the aircraft for deriving operational power therefrom.

10. The communications network of claim 8, wherein each network communications system is electrically connected to a control system of the aircraft for deriving operational information therefrom.

11. The communications network of claim 8, wherein each antenna is physically connected to an external surface of a cargo door of the aircraft.

12. The communications network of claim 8, wherein each mesh network transceiver is disposed in an interior of the aircraft.

13. The communications network of claim 8, wherein the antenna is configured so as not to negatively impact aerodynamic performance of the aircraft when the antenna is connected to the aircraft.

14. An aircraft comprising:
a fuselage having an upper body portion and a lower body portion;
an antenna physically connected to an external surface of the lower body portion of the aircraft fuselage, wherein the antenna conforms to a shape of the lower body portion of the aircraft fuselage and comprises at least one of a conformal printed antenna, a rigid conformal antenna, and a thin film conformal antenna; and
a mesh network transceiver electrically connected to the antenna;
wherein the antenna and the mesh network transceiver operate to transmit signals between an unmanned aerial vehicle ("UAV") and a control station.

15. The aircraft of claim 14, wherein the antenna is physically connected to an external surface of a cargo door of the aircraft.

16. The aircraft of claim 14, wherein the mesh network transceiver is disposed in an interior of the aircraft.

17. The aircraft of claim 14, wherein the signals transmitted between the UAV and the control station comprise aircraft command and control ("C2") signals.

18. The aircraft of claim 14, wherein the antenna is configured so as not to negatively impact aerodynamic performance of the aircraft when the antenna is connected to the aircraft.

* * * * *